(12) United States Patent
Choi et al.

(10) Patent No.: US 11,163,306 B2
(45) Date of Patent: Nov. 2, 2021

(54) APPARATUS AND METHOD FOR CONTROLLING DRIVING OF VEHICLE

(71) Applicants: HYUNDAI MOTOR COMPANY, Seoul (KR); KIA MOTORS CORPORATION, Seoul (KR)

(72) Inventors: Sung Woo Choi, Seoul (KR); Sung Yoon Yeo, Seoul (KR); Young Min Han, Gunpo-si (KR); Seung Geon Moon, Hwaseong-si (KR)

(73) Assignees: HYUNDAI MOTOR COMPANY, San Francisco (KR); KIA MOTORS CORPORATION, Seoul (KR)

( * ) Notice: Subject to any disclaimer, the term of this patent is extended or adjusted under 35 U.S.C. 154(b) by 71 days.

(21) Appl. No.: 16/379,403

(22) Filed: Apr. 9, 2019

(65) Prior Publication Data
US 2020/0192367 A1 Jun. 18, 2020

(30) Foreign Application Priority Data
Dec. 14, 2018 (KR) .................. KR10-2018-0161914

(51) Int. Cl.
*G01C 22/00* (2006.01)
*G05D 1/00* (2006.01)
*G05D 1/02* (2020.01)

(52) U.S. Cl.
CPC .......... *G05D 1/0088* (2013.01); *G05D 1/0223* (2013.01); *G05D 2201/0213* (2013.01)

(58) Field of Classification Search
CPC ...... G05D 1/0088; G05D 1/02; G05D 1/0223; G05D 1/0214; G05D 2201/0213

USPC ........................................................... 701/26
See application file for complete search history.

(56) References Cited

U.S. PATENT DOCUMENTS

| | | | |
|---|---|---|---|
| 2009/0204320 A1* | 8/2009 | Shaffer .............. | G01C 21/3415 701/533 |
| 2013/0103304 A1* | 4/2013 | Nishibashi ............. | G01C 21/34 701/410 |
| 2017/0269591 A1* | 9/2017 | Tanaka ................. | G05D 1/0022 |
| 2018/0126989 A1* | 5/2018 | Krabot ............ | B60W 30/18163 |
| 2018/0196444 A1* | 7/2018 | Yi .......................... | B60W 10/04 |
| 2018/0345966 A1* | 12/2018 | Aso ......................... | G01C 21/26 |
| 2019/0018419 A1* | 1/2019 | Lee ........................ | G08G 1/163 |

(Continued)

FOREIGN PATENT DOCUMENTS

JP 2011207242 A * 10/2011

OTHER PUBLICATIONS

English Translation for JP2011207242A.*
IP.com Search.*

*Primary Examiner* — Mahmoud S Ismail
(74) *Attorney, Agent, or Firm* — Morgan, Lewis & Bockius LLP

(57) ABSTRACT

A driving controlling apparatus and method of a vehicle is provided. The apparatus includes a navigation device providing a guide route and a travelable route and a controller. The controller is configured to determine one of the guide route and the travelable route as a driving control target depending on a result of determining whether to deviate from the guide route and a result of determining whether the guide route is set on a pocket-shaped off ramp and the vehicle is driving on an outermost lane of a road on which the vehicle is currently driving.

18 Claims, 8 Drawing Sheets

(56) References Cited

U.S. PATENT DOCUMENTS

2019/0164420 A1* 5/2019 Wendt .............. G01C 21/3691
2020/0346654 A1* 11/2020 Kojo ................ G08G 1/096725

* cited by examiner

APPARATUS AND METHOD FOR CONTROLLING DRIVING OF VEHICLE

CROSS-REFERENCE TO RELATED APPLICATION

This application is claims priority to and the benefit of Korean Patent Application No. 10-2018-0161914, filed on Dec. 14, 2018, which is incorporated herein by reference in its entirety.

TECHNICAL FIELD

The present disclosure relates to an apparatus and a method for controlling the driving of a vehicle.

BACKGROUND

The statements in this section merely provide background information related to the present disclosure and may not constitute prior art.

In general, a driving controlling apparatus of a vehicle calculates the curvature and curve section of a road based on the driving route found from navigation device and controls the driving of the vehicle based on the calculation.

However, there is a problem that the driving of the vehicle is controlled based on the found route, or the driving of the vehicle is controlled based on only the curvature of the road, even when the vehicle is driving away from the found driving route.

For example, the vehicle may be controlled to decelerate because the driving of the vehicle is controlled based on the driving route found by the navigation device, when the guide route found by the navigation device is set on the off ramp of the split point in front of the vehicle.

In this case, the vehicle suddenly decelerates while driving on an expressway because the driving of the vehicle is controlled based on the found guide route even when the vehicle does not drive along the found guide route but continuously drives the road on which the vehicle is driving. Therefore, the vehicle may collide with a subsequent vehicle.

On the other hand, the vehicle may be controlled not to decelerate because the driving of the vehicle is controlled based on the driving route found by the navigation device, when the driving route found by the navigation device is set to include a route for driving an expressway.

In this case, because the navigation device controls the driving of the vehicle based on the found driving route even when the vehicle does not drive the expressway along the found driving route, the vehicle does not decelerate even when entering the actual off ramp. Therefore, an accident may occur.

SUMMARY

An aspect of the present disclosure provides an apparatus and a method for controlling the driving of a vehicle that control the driving based on a road curvature of a route on which the vehicle is actually driving even when the vehicle does not drive on the driving route found from navigation device.

The technical problems to be solved by the present inventive concept are not limited to the aforementioned problems, and any other technical problems not mentioned herein will be clearly understood from the following description by those skilled in the art to which the present disclosure pertains.

In one form of the present disclosure, a driving controlling apparatus of a vehicle includes navigation device providing a guide route set based on input destination and to provide a travelable route and a controller. The controller is configured to determine one of the guide route and the travelable route as a driving control target depending on a result of determining whether to deviate from the guide route and a result of determining whether the guide route is set on a pocket-shaped off ramp and the vehicle is driving on an outermost lane of a road on which the vehicle is currently driving.

In one form of the present disclosure, the travelable route is set on a road other than a road on which the guide route is set.

In one form of the present disclosure, the controller is configured to determine that the vehicle does not deviate from the guide route, when the vehicle is travelable depending on the guide route when the vehicle is driving on the road on which the vehicle is currently driving.

In one form of the present disclosure, the controller is configured to determine the guide route as the driving control target, when determining that the vehicle does not deviate from the guide route.

In one form of the present disclosure, the controller is configured to determine the guide route as the driving control target, when determining that the vehicle deviates from the guide route, when determining that the guide route is set on the off ramp, the off ramp is in the pocket shape, the vehicle is driving on the outermost lane of the road on which the vehicle is currently driving, and the vehicle does not pass through a split point.

In one form of the present disclosure, the off ramp includes a shape in which the outermost lane is added to the road on which the vehicle is currently driving, when the off ramp is in the pocket shape.

In one form of the present disclosure, the controller is configured to determine the travelable route as the driving control target, when determining that the vehicle deviates from the guide route, when determining at least one of that the guide route is not set on the off ramp, that the off ramp is not in the pocket shape, that the vehicle is not driving on the outermost lane of the road on which the vehicle is currently driving, and that the vehicle passes through a split point.

In one form of the present disclosure, the off ramp includes a shape in which the outermost lane of the road on which the vehicle is currently driving is extended, when the off ramp is not in the pocket shape.

In one form of the present disclosure, the controller is configured to control a speed based on a point, at which an absolute value of a required deceleration calculated at each point of a plurality of curve sections included in the guide route has the great value, when determining the guide route as the driving control target.

In one form an aspect of the present disclosure, the controller is configured to control a speed based on a point, at which an absolute value of a required deceleration calculated at each point of a plurality of curve sections included in the travelable route has the great value, when determining the travelable route as the driving control target.

In one form of the present disclosure, a driving controlling method of a vehicle includes receiving a guide route set based on input destination and receiving a travelable route, determining whether to deviate from the guide route, determining whether the guide route is set on a pocket-shaped off ramp and the vehicle is driving on an outermost lane of a road on which the vehicle is currently driving, and determining one of the guide route and the travelable route as a driving control target depending on the determination result.

In one form of the present disclosure, the travelable route is set on a road other than a road on which the guide route is set.

In one form of the present disclosure, the method further includes determining that the vehicle does not deviate from the guide route, when the vehicle is travelable depending on the guide route when the vehicle is driving on the road on which the vehicle is currently driving.

In one form of the present disclosure, the method further includes determining the guide route as the driving control target, when determining that the vehicle does not deviate from the guide route.

In one form of the present disclosure, the method further includes determining the guide route as the driving control target, when determining that the vehicle deviates from the guide route, when determining that the guide route is set on the off ramp, the off ramp is in a pocket shape, the vehicle is driving on the outermost lane of the road on which the vehicle is currently driving, and the vehicle does not pass through a split point.

In one form of the present disclosure, the off ramp includes a shape in which the outermost lane is added to the road on which the vehicle is currently driving, when the off ramp is in the pocket shape.

In one form of the present disclosure, the method further includes determining the travelable route as the driving control target, when determining that the vehicle deviates from the guide route, when determining at least one of that the guide route is not set on the off ramp, that the off ramp is not in the pocket shape, that the vehicle is not driving on the outermost lane of the road on which the vehicle is currently driving, and that the vehicle passes through a split point.

In one form of the present disclosure, the off ramp includes a shape in which the outermost lane of the road on which the vehicle is currently driving is extended, when the off ramp is not in the pocket shape.

In one form of the present disclosure, the method further includes controlling a speed based on a point, at which an absolute value of a required deceleration calculated at each point of a plurality of curve sections included in the guide route has the great value, when determining the guide route as the driving control target.

In one form of the present disclosure, the method further includes controlling a speed based on a point, at which an absolute value of a required deceleration calculated at each point of a plurality of curve sections included in the travelable route has the great value, when determining the travelable route as the driving control target.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
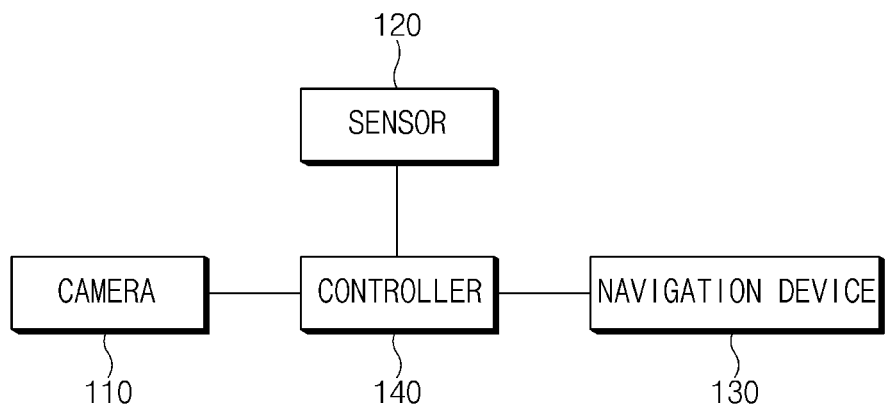
FIG. 1 is a block diagram illustrating an apparatus for controlling driving of a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing some forms of the present disclosure, the terms first, second, A, B, (a), (b), and the like may be used herein. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which this invention belongs. It will be understood that terms used herein should be interpreted as having a meaning that is consistent with their meaning in the context of the present disclosure and the relevant art and will not be interpreted in an idealized or overly formal sense unless expressly so defined herein.

FIG. 1 is a block diagram illustrating a driving controlling apparatus of a vehicle in some forms of the present disclosure.

As illustrated in FIG. 1, the driving controlling apparatus of a vehicle may include a camera 110, a sensor 120, navigation device 130, and a controller 140.

The camera 110 may include a front camera installed on the front surface of the vehicle, and a side camera installed on the bottom surface of the side mirror.

The front camera may capture the front view of the vehicle while the vehicle is moving. The image captured by the front camera may include the environment in front of the vehicle, and may include, for example, a lane type, a lane color, a lane, a preceding vehicle that is driving in front, and the like.

The side camera may capture a blind spot where the driver cannot identify through the side mirror or may operate as a side mirror. The side camera may capture the side view and rear view of the vehicle.

The sensor 120 may detect a preceding vehicle in front of the vehicle, a road, a stationary object including a structure or the like installed in the vicinity of a road, an approaching vehicle in the opposite lane, and the like.

The sensor 120 may sense a signal reflected from the lane marking of a road or the surface of the road to calculate data including ground information and lane information of the road. The sensor 120 may include radar or Light detection and Ranging (Lidar), but may be implemented with Lidar for precise measurement.

The navigation device 130 may provide a user with information about a specific area, for example, a user's surrounding area in the form of a map, a text, various symbols, or the like and may provide the user with information about the guide route from one location to another location. The information of the guide route may include the information of the curve section included in the guide route.

The navigation device 130 may also provide information about a travelable route other than the guide route, in addition to providing a guide route. The information of the travelable route may include the information of the curve section included in the travelable route.

The navigation device 130 may receive the current location of the vehicle by including a GPS receiver and may provide map image information of a specific area, road guide image information, road guide voice information, speed information of a vehicle, destination information, and the like based on the current location of the vehicle. For example, the navigation device 130 may provide information about a type of road on which a vehicle is currently driving, the total number of lanes of a road on which a vehicle is currently driving, a lane on which a vehicle is currently driving, whether there is a split point in front, and the like.

The controller 140 may control overall operations of the driving controlling apparatus of a vehicle.

The controller 140 may control the vehicle so as to receive information on a guide route including a guide route and information on a travelable route including a travelable route, from the navigation device 130.

Here, the information on the guide route may include information about a route to the destination when the destination is entered, and a road where the route is established; the information on a travelable route may include information about a route on which the vehicle is travelable, and a road where the route is established, without including a route to the destination.

The controller 140 may determine whether a split point is present in front based on the road information received from the navigation device 130.

Here, the split point may refer to a point where different roads are connected to each other; the split point may include a pocket-shaped off ramp or may include a split-type off ramp.

The pocket-shaped off ramp may mean that an off-ramp is added to the most inner or outer lane; the split-type off ramp may mean that an off-ramp is split from the most inner or outer lane.

The controller 140 may determine the guide route as a driving control target, when the controller 140 determines that there is no split point in front of the vehicle.

The controller 140 may determine (predict) whether to deviate from the guide route, based on the current driving lane.

The controller 140 may determine (predict) that the vehicle does not deviate from the guide route, when the vehicle is currently travelable along the guide route while driving the currently driving lane; the controller 140 may determine (predict) that the vehicle will deviate from the guide route, when it is impossible to drive along the guide route while the vehicle is driving the currently driving lane.

The controller 140 may control the driving based on the guide route when determining that the vehicle does not deviate from the guide route.

The controller 140 may determine whether the guide route is set on the off ramp when determining that the vehicle will deviate from the guide route.

The controller 140 may determine whether the off ramp is in the pocket shape, when determining that the guide route is set on the off ramp.

The controller 140 determines whether the current driving lane is the outermost lane of the current driving road, when determining that the off ramp is in the pocket shape. Here, the outermost lane may mean the edge lane of the road, that is, the first lane or the most outer lane.

The controller 140 determines whether the vehicle passes through the split point, when determining that the current driving lane is the outermost lane of the current driving road. The passing through a split point may mean that the vehicle passes the off ramp by without entering the off ramp.

That is, even though the controller 140 determines that the vehicle will deviate from the guide route, because the probability that the vehicle is driving on the guide route is high when the guide route is established on the pocket-shaped off ramp, the current driving lane is the outermost lane of the current driving road, and the vehicle does not pass through a split point, the controller 140 may determine the guide route as the driving control target.

In addition, when the controller 140 determines that the vehicle will deviate from the guide route, and when the controller 140 determines that the guide route is not set on an off ramp, the current driving lane is not the outermost lane of the current driving road, or the vehicle passes through a split point, the controller 140 may determine the travelable route as a driving control target. Here, the controller 140 may determine that the off ramp is not in the pocket shape, when the off ramp is in the split shape.

The controller 140 may calculate the road information included in the route determined as the driving control target, when the controller 140 determines either a guide route or a travelable route as a driving control target.

In particular, the controller 140 extracts a plurality of curve sections in a predetermined region of the route determined as the target of driving control, and calculates the curvature radius of a plurality of curve sections, the safe speed in the curve section, and the required deceleration to converge to the driving speed in the curve section, in a predetermined region. Here, a predetermined region may mean a region from a vehicle to an arbitrary distance.

The controller 140 may extract a curve section, in which a safe speed is smaller than a smart cruise control setting speed and a required deceleration is the largest, from among a plurality of curve sections in a predetermined region to control the speed of the vehicle based on the extracted curve section.

For example, the controller 140 extracts a plurality of curve sections A and B in a predetermined region; when the controller 140 calculates a curvature radius at a first point of the curve section A as 150 m, calculates a safe speed as 70 kph, and calculates a required deceleration as −0.9 m/s², and when the controller 140 calculates a curvature radius at a second point of the curve section B as 70 m, calculates the safe speed as 50 kph, and calculates the required deceleration as −0.5 m/s², the controller 140 may determine the first point of the curve section A as the driving control target and may control the vehicle so as to decrease the speed of the vehicle.

Figure 2:
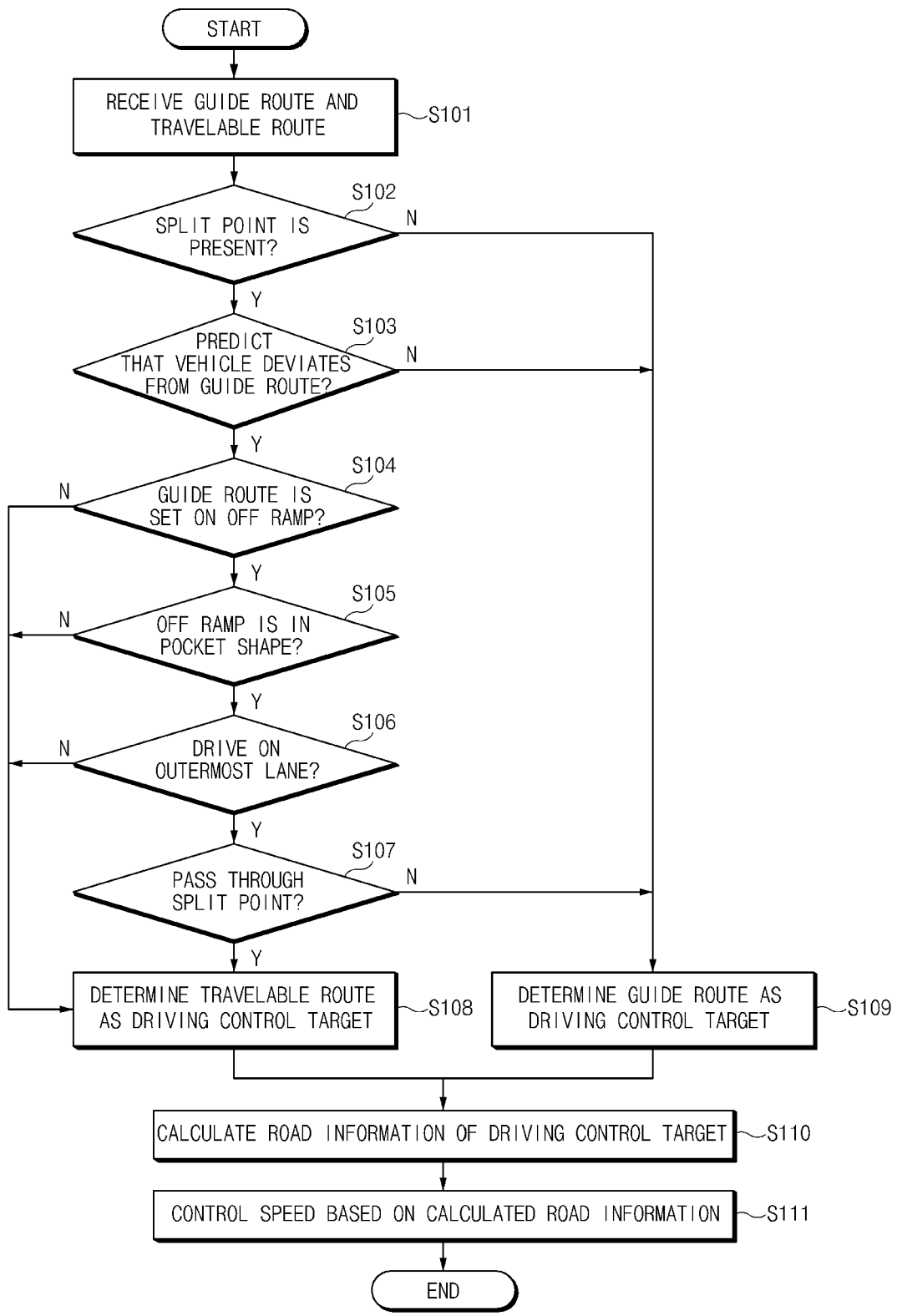
FIG. 2 is a flowchart illustrating a driving controlling method of a vehicle in one form of the present disclosure.

FIG. 2 is a flowchart illustrating a driving controlling method of a vehicle in some forms of the present disclosure.

As illustrated in FIG. 2, in operation S101, the controller 140 receives information on a guide route including the guide route and information on a travelable route including the travelable route, from the navigation device 130. Here, the information on the guide route may include information about a route to the destination when the destination is entered, and a road where the route is established; the information on the travelable route may include information about a route on which the vehicle is travelable, and a road where the route is established, without including a route to the destination.

In operation S102, the controller 140 determines whether a split point is present in front based on the road information received from the navigation device 130.

In operation S103, the controller 140 determines whether to deviate from the guide route based on the current driving lane, when the controller 140 determines that there is a split point in front of the vehicle (Y).

When the controller 140 determines that there is no split point in front of the vehicle in operation S102 (N), the controller 140 may determine the driving control target based on the guide route in operation S109, may calculate road information of the guide route in operation S110, and may control the speed based on the calculated road information in operation S111.

In operation S103, the controller 140 may determine (predict) that the vehicle does not deviate from the guide route, when the vehicle is currently travelable along the guide route while driving the currently driving lane; the controller 140 may determine (predict) that the vehicle will deviate from the guide route, when it is impossible to drive along the guide route while the vehicle is driving the currently driving lane.

When the controller 140 determines that the vehicle does not deviate from the guide route in operation S103 (N), the controller 140 may determine the driving control target based on the guide route in operation S109, may calculate road information of the guide route in operation S110, and may control the speed based on the calculated road information in operation S111.

When the controller 140 determines that the vehicle deviates from the guide route in operation S103 (Y), the controller 140 determines whether a guide route is set on the off ramp in operation S104.

When the controller 140 determines that the guide route is set on the off ramp in operation S104, the controller 140 determines whether the off ramp is in a pocket shape in operation S105.

When the controller 140 determines that the off ramp is in the pocket shape in operation S105 (Y), the controller 140 determines whether the current driving lane is the outermost lane of the current driving road in operation S106.

When the controller 140 determining that the current driving lane is the outermost lane of the current driving road in operation S106 (Y), the controller 140 determines whether the vehicle passes through the split point in operation S107. The passing through a split point in operation S107 may mean that the vehicle passes the off ramp by without entering the off ramp.

When the controller 140 determines that a vehicle does not pass through the split point in operation S107, in operation S109, the controller 140 determines the guide route as the driving control target, because the probability that the vehicle will enter the off ramp is high.

When the controller 140 determines that a guide route is not set on the off ramp in operation S104 (N), when the controller 140 determines that the off ramp is not in the pocket shape in operation S105 (N), when the controller 140 determining that the current driving lane is not the outermost lane of the current driving road in operation S106 (N), or when the controller 140 determines that the vehicle passes through the split point in operation S107, in operation S108, the controller 140 determines the travelable route as a driving control target.

When the controller 140 determines one of the travelable route and the guide route as the driving control target in operation S108 or operation S109, in operation S110, the controller calculates road information included in the route of the driving control target.

In operation S110, the controller 140 may extract a plurality of curve sections in a predetermined region of the route determined as the target of driving control, and may calculate the curvature radius of a plurality of curve sections, the safe speed in the curve section, and the required deceleration to converge to the driving speed in the curve section, in a predetermined region.

In operation S111, the controller 140 controls the speed of the vehicle based on the calculated road information.

In operation S111, the controller 140 may extract a curve section, in which a safe speed is smaller than a smart cruise control setting speed and a required deceleration is the largest, from among a plurality of curve sections in a predetermined region to control the speed of the vehicle based on the extracted curve section.

In operation S111, the controller 140 extracts a plurality of curve sections A and B in a predetermined region; when the controller 140 calculates a curvature radius at a first point of the curve section A as 150 m, calculates a safe speed as 70 kph, and calculates a required deceleration as −0.9 m/s², and when the controller 140 calculates a curvature radius at a second point of the curve section B as 70 m, calculates the safe speed as 50 kph, and calculates the required deceleration as −0.5 m/s², the controller 140 may determine the curve section A as the driving control target and may control the vehicle so as to decrease the speed of the vehicle.

Figure 3:
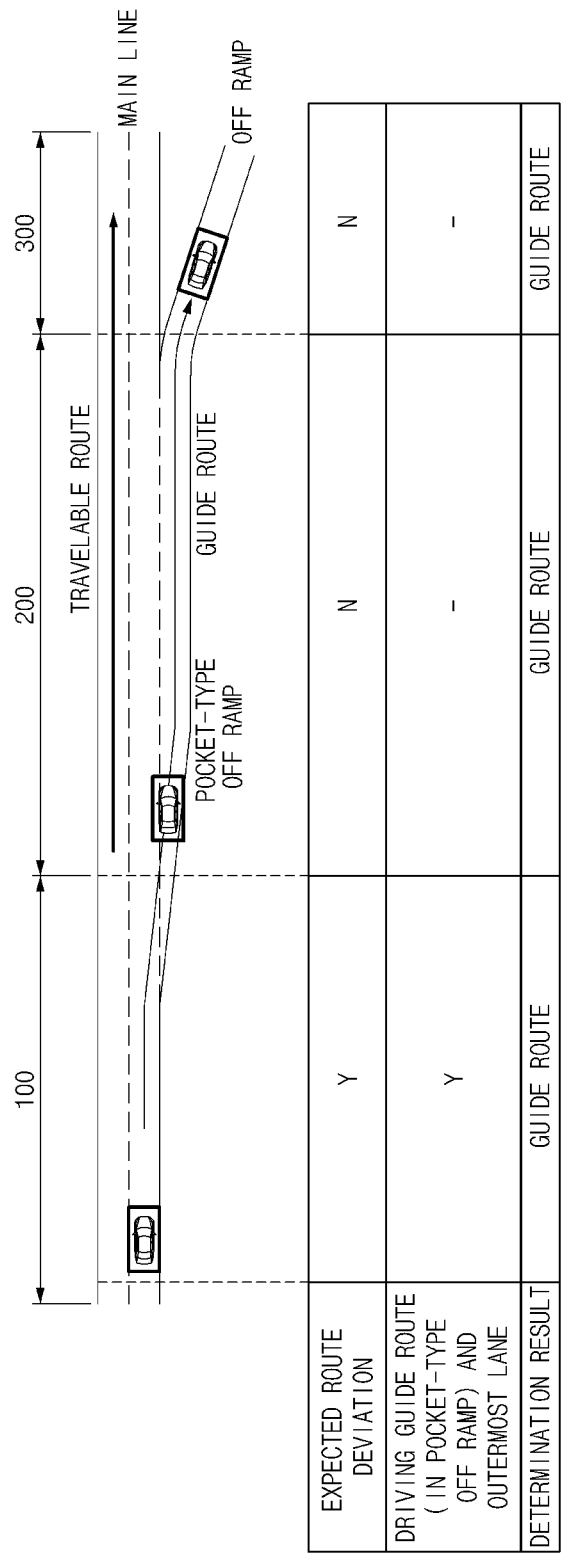
FIG. 3 is a view illustrating a method of controlling driving on a pocket-shaped off ramp in one form of the present disclosure.

FIG. 3 is a view illustrating a method of controlling driving on a pocket-shaped off ramp in some forms of the present disclosure.

As illustrated in FIG. 3, a road including a pocket-shaped off ramp may include a first section 100, a second section 200, and a third section 300.

The controller 140 may determine that a split point at which different roads are connected to each other is present in front of the vehicle, based on the information received from the navigation device 130 and may determine that a pocket-shaped off ramp is established at the split point.

The controller 140 may receive information on a guide route including the guide route and information on a driving route including a travelable route. Furthermore, the controller 140 may determine that a guide route to the destination is set on the pocket-shaped off ramp, based on the information received from the navigation device 130.

Because the controller 140 determines that the guide route is set on the pocket-shaped off ramp, the controller 140 may determine the travelable route on the road other than the off ramp.

The controller 140 may determine that the vehicle will deviate from the guide route when driving on a current driving road in the first section 100; the controller 140 may determine that the guide route is established on a pocket-shaped off ramp and the vehicle is driving on the outermost lane of a current driving road to determine that the guide route is a driving control target in the first section 100.

The controller 140 may determine that the vehicle does not deviate from the guide route when driving on the current driving road in the second section 200 and third section 300; the controller 140 may determine the guide route as the driving control target, when the controller 140 determines that the vehicle does not deviate from the guide route.

Accordingly, the controller 140 may calculate the road information included in the guide route, and may control the speed of the vehicle based on the calculated road information.

The controller 140 may determine that the vehicle will be driving along the guide route from the first section 100 to allow the vehicle to gradually decelerate at the split point.

Figure 4:
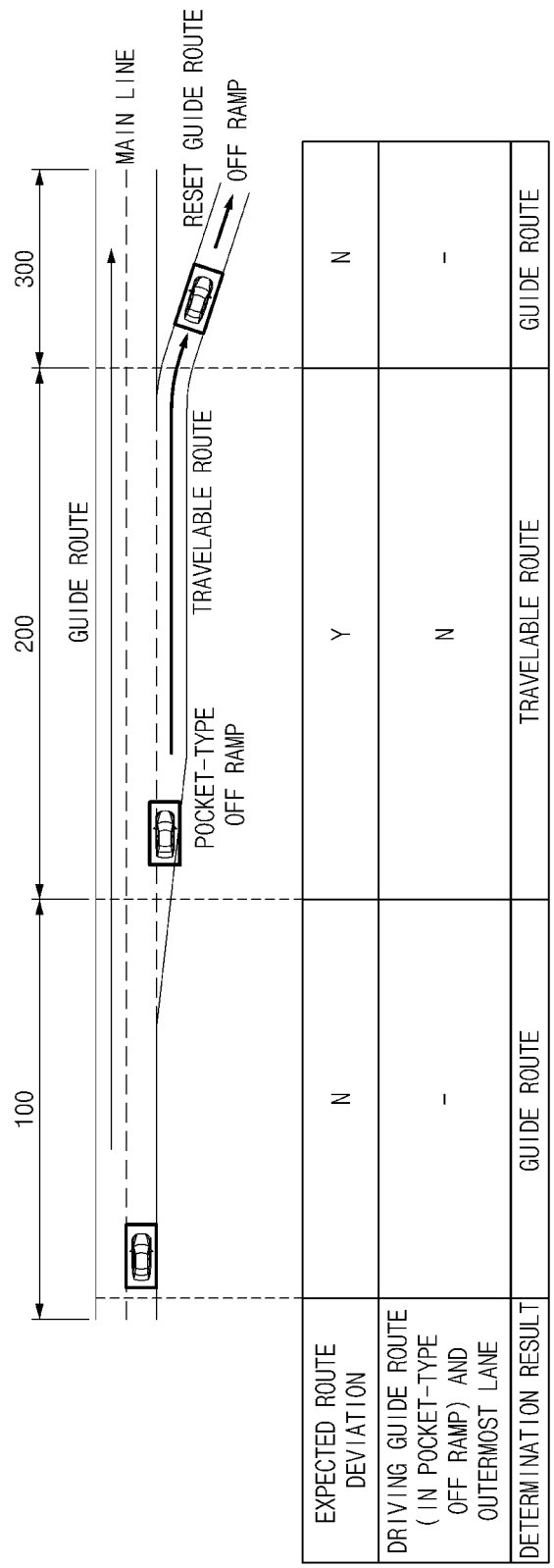
FIG. 4 is a view illustrating a method of controlling driving on a pocket-shaped off ramp in another form of the present disclosure.

FIG. 4 is a view illustrating a method of controlling driving on a pocket-shaped off ramp in some forms of the present disclosure.

As illustrated in FIG. 4, a road including a pocket-shaped off ramp may include the first section 100, the second section 200, and the third section 300.

The controller 140 may determine that a split point at which different roads are connected to each other is present in front of the vehicle, based on the information received from the navigation device 130 and may determine that a pocket-shaped off ramp is established at the split point.

The controller 140 may receive information on a guide route including the guide route and information on a driving route including a travelable route, from the navigation device 130. The controller 140 may determine that the guide route is set on a current driving road, based on the information received from the navigation device 130.

Because the controller 140 determines that the guide route is set on the current driving road, the controller 140 may determine that the pocket-shaped off ramp is a travelable route.

Because the controller 140 determines that the vehicle does not deviate from the guide route when driving on the current driving road in the first section 100, the controller 140 may determine the guide route as the driving control target.

The controller 140 may determine that the vehicle will deviate from the guide route when driving on a current driving road in second section 200; the controller 140 may determine that the guide route is not established on a pocket-shaped off ramp and the vehicle is driving on the outermost lane of the current driving road.

The controller 140 determines that the vehicle will deviate from the guide route; because the guide route is not established on a pocket-shaped off ramp, the controller 140 may determine the travelable route as a driving control target.

The controller 140 may calculate the road information included in the travelable route, and may control the speed of the vehicle based on the calculated road information.

That is, as it is expected that the vehicle deviates from the guide route, the controller 140 may determine the travelable route as a driving control target, without determining that the guide route is a driving control target, and then the controller 140 may control the speed of the vehicle based on the road information included in the travelable route.

As such, the controller 140 does not control driving so as not to decrease the speed based on the guide route but controls the driving so as to decrease the speed appropriately at the off ramp, and thus the problem caused by conventionally determining the guide route as the driving control target may be prevented.

The controller 140 may determine that the vehicle deviates from the guide route in the third section 300 based on the information received from the navigation device and may reset the route to the destination based on the current location, to the pocket-shaped off ramp.

The controller 140 may determine whether the vehicle deviates from the guide route, based on the reset guide route.

Because the controller 140 may determine that the vehicle does not deviate from the guide route on the off ramp, the controller 140 may determine the guide route reset on the pocket-shaped off ramp, as the driving control target.

Figure 5:
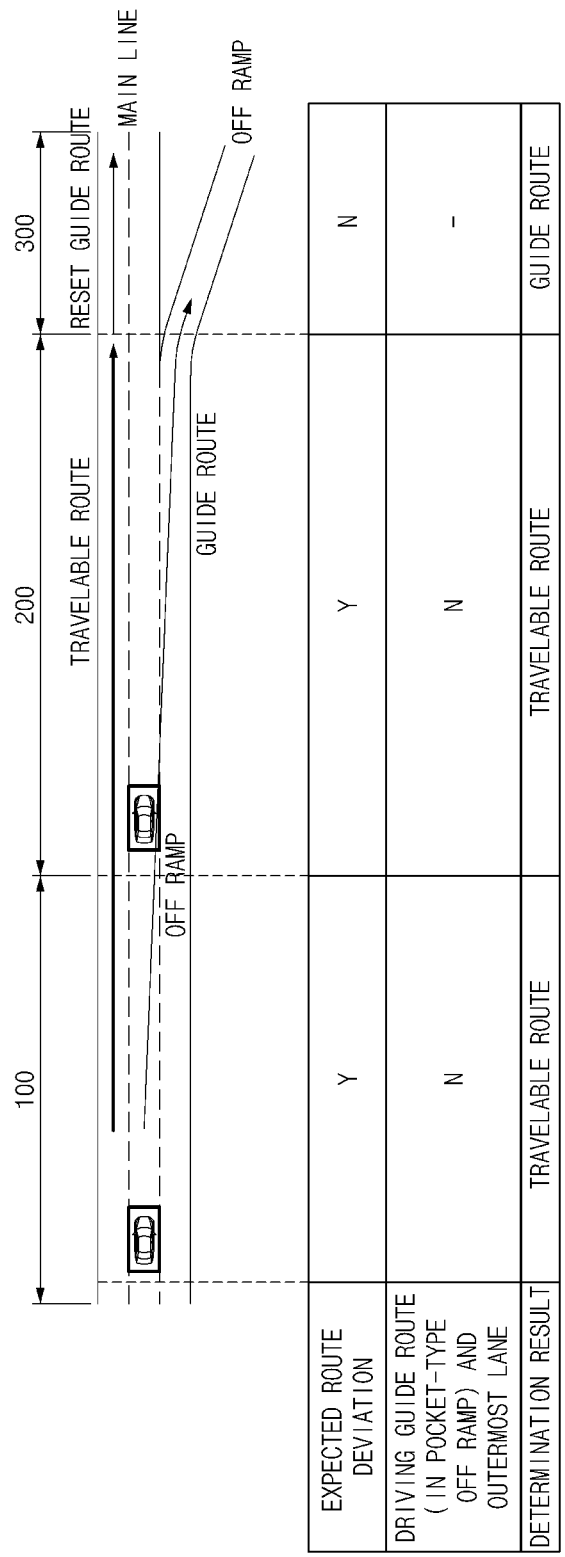
FIG. 5 is a view illustrating a method of controlling driving on a split-type off ramp in one form of the present disclosure.

FIG. 5 is a view illustrating a method of controlling driving on a split-type off ramp in some forms of the present disclosure.

As illustrated in FIG. 5, a road including a split-type off ramp may include the first section 100, the second section 200, and the third section 300.

The controller 140 may determine that a split point at which different roads are connected to each other is present in front of the vehicle, based on the information received from the navigation device 130 and may determine that a split-type off ramp is established at the split point.

The controller 140 may receive information on a guide route including the guide route and information on a travelable route including a travelable route, from the navigation device 130. Furthermore, the controller 140 may determine that a guide route to the destination is set on the split-type off ramp, based on the information received from the navigation device 130.

Because the controller 140 determines that the guide route is set on the split-type off ramp, the controller 140 may determine the travelable route on the road other than the off ramp.

The controller 140 may determine that the vehicle will deviate from the guide route when driving on a current driving road in the first section 100 and the second section 200; the controller 140 may determine that the guide route is established on a split-type off ramp and the current driving lane is not the outermost lane of the current driving road, to determine that the travelable route is a driving control target in the first section 100 and the second section 200.

The controller 140 determines that the vehicle will deviate from the guide route; because the guide route is established on a split-type off ramp, not a pocket-shaped off ramp, the controller 140 may determine the travelable route as the driving control target.

The controller 140 may calculate the road information included in the travelable route, and may control the speed of the vehicle based on the calculated road information.

That is, as it is expected that the vehicle deviates from the guide route, the controller 140 may determine the travelable route as a driving control target, without determining that the guide route is a driving control target, and then the controller 140 may control the speed of the vehicle based on the road information included in the travelable route.

As such, the controller 140 does not control driving so as to decrease the speed based on the guide route but controls the driving so as not to decrease the speed on a current driving road, and thus the problem caused by conventionally determining the guide route as the driving control target may be prevented.

The controller 140 may determine that the vehicle deviates from the guide route in the third section 300 based on the information received from the navigation device and may reset the route to the destination based on the current location, to a road on which the vehicle is currently driving.

The controller 140 may determine whether the vehicle deviates from the guide route, based on the reset guide route.

Because the controller 140 may determine that the vehicle does not deviate from the guide route on the road on which the vehicle is currently driving, the controller 140 may determine the guide route reset on the current driving road, as the driving control target.

Figure 6:
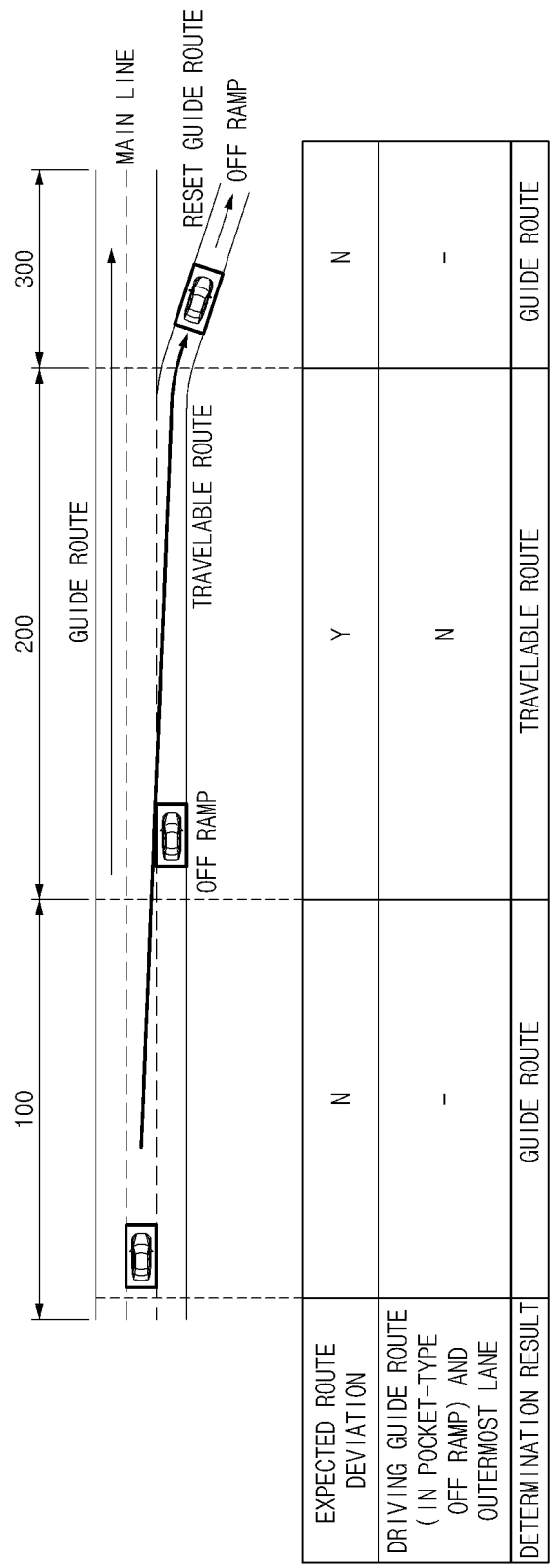
FIG. 6 is a view illustrating a method of controlling driving on a split-type off ramp in another form of the present disclosure.

FIG. 6 is a view illustrating a method of controlling driving on a split-type off ramp in some forms of the present disclosure.

As illustrated in FIG. 6, a road including a split-type off ramp may include the first section 100, the second section 200, and the third section 300.

The controller 140 may determine that a split point at which different roads are connected to each other is present in front of the vehicle, based on the information received from the navigation device 130 and may determine that a split-type off ramp is established at the split point.

The controller 140 may receive information on a guide route including the guide route and information on a travelable route including the travelable route, from the navigation device 130. The controller 140 may determine that the guide route is set on a current driving road, based on the information received from the navigation device 130.

Because the controller 140 determines that the guide route is set on the current driving road, the controller 140 may determine that the split-type off ramp is a travelable route.

Because the controller 140 determines that the vehicle does not deviate from the guide route when driving on the current driving road in the first section 100, the controller 140 may determine the guide route as the driving control target.

The controller 140 may determine that the vehicle will deviate from the guide route when driving on a current driving road in second section 200; the controller 140 may determine that the guide route is not established on a pocket-shaped off ramp and the vehicle is driving on the outermost lane of a current driving road.

The controller 140 determines that the vehicle will deviate from the guide route; because the guide route is not established on a pocket-shaped off ramp, the controller 140 may determine the travelable route as a driving control target.

The controller 140 may calculate the road information included in the travelable route, and may control the speed of the vehicle based on the calculated road information.

That is, as it is expected that the vehicle deviates from the guide route, the controller 140 may determine the travelable route as a driving control target, without determining that the guide route is a driving control target, and then the controller 140 may control the speed of the vehicle based on the road information included in the travelable route.

Accordingly, the controller 140 not controls driving so as not to decrease the speed based on the guide route but controls the driving so as to decrease the speed appropriately at the off ramp. As a result, the problem caused by conventionally determining the guide route as the driving control target may be prevented.

The controller 140 may determine that the vehicle deviates from the guide route in the third section 300 based on the information received from the navigation device and may reset the route to the destination based on the current location, to the split-type off ramp.

The controller 140 may determine whether the vehicle deviates from the guide route, based on the reset guide route.

Because the controller 140 may determine that the vehicle does not deviate from the guide route on the off ramp, the controller 140 may determine the guide route reset on the split-type off ramp, as the driving control target.

Figure 7:
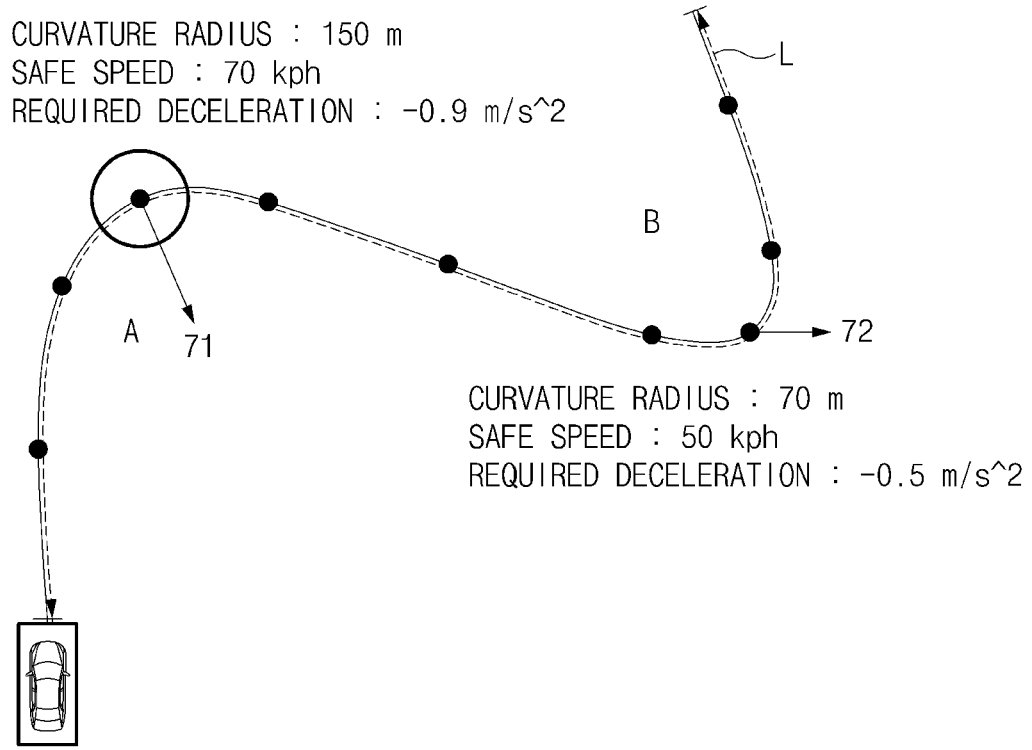
FIG. 7 illustrates a control target selected in a curve section in one form of the present disclosure.

FIG. 7 illustrates a control target selected in a curve section in some forms of the present disclosure.

As illustrated in FIG. 7, when the controller 140 determines that one of a guide route and a travelable route is a driving control target, the controller 140 may extract curve sections A and B within a predetermined region (arbitrary distance L) on a road included in one route of the guide route and the travelable route.

The controller 140 may calculate the curvature radius, safe speed, and required deceleration at a first point 71 of the curve section A and may calculate the curvature radius, safe speed, and required deceleration at a second point 72 of the curve section B.

The controller 140 may determine that a smart cruise control setting speed of the current vehicle is 130 kph, may calculate the curvature radius at the first point 71 as 150 m, may calculate the safe speed at the first point 71 as 70 kph, may calculate the required deceleration at the first point 71 as $-0.9$ m/s$^2$, may calculate the curvature radius at the second point 72 as 70 m, may calculate the safe speed at the second point 72 as 50 kph, and may calculate the required deceleration at the second point 72 as $-0.5$ m/s$^2$.

The controller 140 may determine a point at which the safe speed calculated at each point is less than the smart cruise control setting speed and at which the absolute value of the required deceleration calculated at each point has the largest value, as the driving control target.

Accordingly, the controller 140 may determine that the first point of the curve section A is a driving control target and may control the speed of the vehicle to decrease.

After passing through the first point 71 of the curve section A, the controller 140 determines a point (e.g., the second point 72 of the curve section B) at which the absolute value has the largest value in the remaining curve sections in the predetermined region as the driving control target and may control the speed of the vehicle to decrease.

Figure 8:
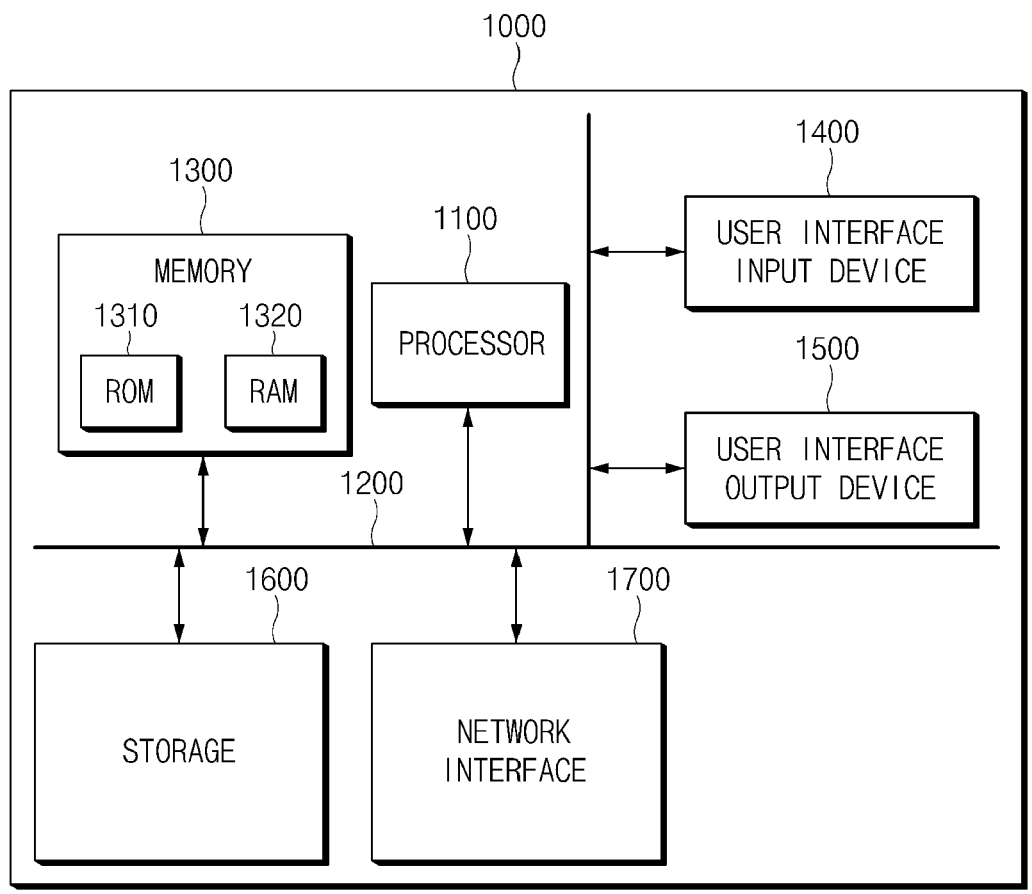
FIG. 8 is a block diagram illustrating a configuration of a computing system performing a method in one form of the present disclosure.

FIG. 8 is a block diagram illustrating a configuration of a computing system performing a method in some forms of the present disclosure.

Referring to FIG. 8, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) 1310 and a random access memory (RAM) 1320.

Thus, the operations of the methods or algorithms described in connection with some forms of the present disclosure disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component in the user terminal.

Hereinabove, although the present disclosure has been described with reference to some forms of the present disclosure and the accompanying drawings, the present disclosure is not limited thereto, but may be variously modified and altered by those skilled in the art to which the present disclosure pertains without departing from the spirit and scope of the present disclosure claimed in the following claims.

Therefore, some forms of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

In some forms of the present disclosure, an apparatus and a method for controlling the driving of a vehicle may control the driving of a vehicle based on a road curvature of a route on which the vehicle is actually driving, thereby inhibiting an accident and allowing a driver to drive curved road safely.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A driving controlling apparatus of a vehicle, the apparatus comprising:
    a navigation device configured to provide a guide route set based on input destination and to provide a travelable route;
    memory storing instructions executable to control the vehicle; and
    a controller configured to execute the instructions to:
        determine the guide route or the travelable route as a driving control target depending on:
            a determination of whether to deviate from the guide route; or
            a determination of whether the guide route is set on a pocket-shaped off ramp, the vehicle is driving on an outermost lane of a road on which the vehicle is currently driving, and the vehicle passes through a split point; and
        calculate road information included in a route of the driving control target and control a speed of the vehicle based on the calculated road information when it is determined that the guide route or the travelable route is the driving control target, wherein the controller is further configured to determine the guide route as the driving control target and control the vehicle to drive on the pocket-shaped off ramp when:
        the vehicle is determined to deviate from the guide route when the vehicle is not travelable depending on the guide route when the vehicle is driving on the road on which the vehicle is currently driving;
        the guide route is set on the pocket-shaped off ramp;
        the off ramp is in a pocket shape;
        the vehicle is driving on the outermost lane of the road on which the vehicle is currently driving; and
        the vehicle does not pass through the split point.

2. The apparatus of claim 1, wherein the travelable route is set on a road other than a road on which the guide route is set.

3. The apparatus of claim 1, wherein the controller is configured to:
    when the vehicle is driving on the road on which the vehicle is currently driving based on the guide route, determine that the vehicle does not deviate from the guide route.

4. The apparatus of claim 1, wherein the controller is configured to:
    when the vehicle is determined not to deviate from the guide route, determine the guide route as the driving control target.

5. The apparatus of claim 1, wherein the pocket-shaped off ramp includes a shape in which the outermost lane is added to the road on which the vehicle is currently driving.

6. The apparatus of claim 1, wherein the controller is configured to determine the travelable route as the driving control target at least when:
    the vehicle is determined to deviate from the guide route;
    the guide route is not set on the pocket-shaped off ramp;
    the off ramp is not in the pocket shape;
    the vehicle is not driving on the outermost lane of the road on which the vehicle is currently driving; or
    the vehicle passes through the split point.

7. The apparatus of claim 6, wherein a non-pocket shaped off ramp includes a shape extended to the outermost lane of the road on which the vehicle is currently driving.

8. The apparatus of claim 1, wherein the controller is configured to:
    when the guide route is determined as the driving control target, control a speed based on a first point having a maximum absolute value of a required deceleration that is calculated at each point of a plurality of curve sections included in the guide route.

9. The apparatus of claim 1, wherein the controller is configured to:
    when the travelable route is determined as the driving control target, control a speed based on a second point having a maximum absolute value of a required deceleration that is calculated at each point of a plurality of curve sections included in the travelable route.

10. A driving controlling method of a vehicle, the method comprising:
    receiving, by a controller, a guide route set based on input destination;
    receiving, by a controller, a travelable route;
    determining, by a controller, the guide route or the travelable route as a driving control target depending on:
        a determination of whether to deviate from the guide route; or
        a determination of whether the guide route is set on a pocket-shaped off ramp, the vehicle is driving on an outermost lane of a road on which the vehicle is currently driving, and the vehicle passes through a split point;

when it is determined that the guide route or the travelable route is the driving control target, calculating road information included in a route of the driving control target and controlling a speed of the vehicle based on the calculated road information; and determining the guide route as the driving control target and controlling the vehicle to drive on the pocket-shaped off ramp when:

the vehicle is determined to deviate from the guide route when the vehicle is not travelable depending on the guide route when the vehicle is driving on the road on which the vehicle is currently driving;

the guide route is set on the pocket-shaped off ramp;

the off ramp is in a pocket shape;

the vehicle is driving on the outermost lane of the road on which the vehicle is currently driving; and the vehicle does not pass through the split point.

11. The method of claim 10, wherein the travelable route is set on a road other than a road on which the guide route is set.

12. The method of claim 10, wherein the method further comprises:

when the vehicle is driving on the road on which the vehicle is currently driving based on the guide route, determining that the vehicle does not deviate from the guide route.

13. The method of claim 10, wherein the method further comprises:

when the vehicle is determined not to deviate from the guide route, determining the guide route as the driving control target.

14. The method of claim 10, wherein the pocket-shaped off ramp includes a shape in which an outermost lane is added to the road on which the vehicle is currently driving.

15. The method of claim 10, wherein the method further comprises:

determining the travelable route as the driving control target when:

the vehicle is determined to deviate from the guide route;

the guide route is not set on the pocket-shaped off ramp;

the off ramp is not in the pocket shape;

the vehicle is not driving on the outermost lane of the road on which the vehicle is currently driving; or the vehicle passes through the split point.

16. The method of claim 15, wherein a non-pocket off ramp includes a shape extended to the outermost lane of the road on which the vehicle is currently driving.

17. The method of claim 10, wherein the method further comprises:

when the guide route is determined as the driving control target, controlling a speed based on a first point having a maximum absolute value of a required deceleration that is calculated at each point of a plurality of curve sections included in the guide route.

18. The method of claim 10, wherein the method further comprises:

when the travelable route is determined as the driving control target, controlling a speed based on a second point having a maximum absolute value of a required deceleration that is calculated at each point of a plurality of curve sections included in the travelable route.

* * * * *